United States Patent [19]

Luttinger et al.

[11] 4,141,877

[45] Feb. 27, 1979

[54] PROCESSING ORGANIC POLYMERS WITH HYDRATED GLASSES

[75] Inventors: Manfred Luttinger, Columbus, Ohio; Anthony R. Olszewski, Bath; Donald R. Parnell, Big Flats, both of N.Y.

[73] Assignee: Corning Glass Works, Corning, N.Y.

[21] Appl. No.: 830,604

[22] Filed: Sep. 6, 1977

[51] Int. Cl.² ............................................. C08L 63/00
[52] U.S. Cl. ........................... 260/37 EP; 260/37 R; 260/40 R; 260/42.15; 260/42.47
[58] Field of Search .............. 260/37 EP, 40 R, 42.15, 260/42.47; 106/52, 74

[56] References Cited

U.S. PATENT DOCUMENTS

| | | | |
|---|---|---|---|
| 3,498,802 | 3/1970 | Bickford et al. | 106/74 X |
| 3,510,444 | 5/1970 | Vandenberg et al. | 260/37 EP |
| 3,763,070 | 10/1973 | Shearing | 260/37 EP X |
| 3,769,250 | 10/1973 | Nickles | 260/37 EP |
| 3,840,380 | 10/1974 | Kraemer et al. | 106/74 |
| 3,853,577 | 12/1974 | Nishida et al. | 260/37 EP X |
| 3,912,481 | 10/1975 | Bartholomew et al. | 106/74 X |
| 3,991,008 | 11/1976 | Temin et al. | 260/42.15 |

*Primary Examiner*—Lewis T. Jacobs
*Attorney, Agent, or Firm*—Clinton S. Janes, Jr.; Clarence R. Patty, Jr.

[57] ABSTRACT

This invention relates to the coprocessing of hydrated glass with organic polymers to form integral bodies which can be stronger, tougher, and more durable than the original hydrated glass and stiffer than the original plastic material. The process is amenable to any hydrated glass so long as the processing temperature of the hydrated glass is below the temperature at which decomposition of the organic polymer takes place. Chemical bonding between the hydrated glass and a thermosetting organic polymer is achieved through the use of silane coupling agents. Such are not necessary with thermoplastic polymers. The invention is applicable with both thermosetting and thermoplastic polymers which are resistant to alkali environments.

8 Claims, No Drawings

PROCESSING ORGANIC POLYMERS WITH HYDRATED GLASSES

BACKGROUND OF THE INVENTION

U.S. Pat. No. 3,498,802 discloses the production of materials exhibiting thermoplastic properties by hydrating alkali silicate glass powders of specified compositions. Those glass powders consisted essentially, as expressed in mole percent on the oxide basis, of about 6-20% $Na_2O$ and/or $K_2O$ and 80-94% $SiO_2$, the sum of those components composing at least 90 mole percent of the full composition. Operable optional additions specifically mentioned were PbO, BaO, MgO, $B_2O_3$, $Al_2O_3$, and ZnO. CaO and $Li_2O$ were noted as being desirably absent.

The method disclosed involved contacting the glass powders with a gaseous atmosphere containing at least 50% by weight of $H_2O$ at a pressure of at least one atmosphere and at a temperature commonly within the range of about 100°-200° C. Hydration was continued for a sufficient length of time to produce at least a surface layer on the glass particles containing up to 30% by weight $H_2O$. After hydration, the powders were observed to become adhesive and cohesive when heated to temperatures between about 80°-120° C. This phenomenon permitted shaping the particles into bulk bodies utilizing such conventional forming means as pressing, rolling, extrusion, and injection molding.

U.S. Pat. No. 3,912,481 sets forth another method for making alkali metal silicate materials demonstrating forming properties and physical characteristics akin to those possessed by high polymer organic plastics. The method contemplates subjecting glass particles to a two-step process. First, the glass powders are hydrated and, then, second, the powders are partially dehydrated.

Glass compositions operable in that invention consisted essentially, as expressed in mole percent on the oxide basis, of about 3-25% $Na_2O$ and/or $K_2O$ and 50-95% $SiO_2$, the sum of those components constituting at least 55% of the total composition. Optional compatible metal oxides which could advantageously be added to improve melting or forming of the glass and/or to modify the chemical and physical properties of the hydrated glass included $Al_2O_3$, $B_2O_3$, BaO, CaO, MgO, CdO, PbO, and ZnO. $B_2O_3$, CaO, PbO, and ZnO were useful in amounts up to 25%; BaO and $Al_2O_3$ were operable in quantities up to 35%; and MgO could be employed in amounts up to 20%. Additions of other optional oxides were preferably maintained below 10%, $Li_2O$ appeared to inhibit hydration so no more than about 5% could be tolerated.

As noted above, the process described in that patent involved two steps. First, the glass particles were contacted at temperatures above 100° C. with a gaseous $H_2O$-containing atmosphere at a $H_2O$ pressure sufficiently high to secure a saturated or near-saturated environment. The contact was maintained until at least a surface portion of the glass was saturated with $H_2O$. The quantity of $H_2O$ diffused within the glass is a function of the glass composition and, therefore, could vary from less than 5% by weight up to 35% by weight. Second, the water content of the saturated glass is reduced by contacting the hydrated glass at elevated temperatures with a gaseous atmosphere of lower relative humidity. Commonly, the water content was reduced to between about 1-12% by weight, this again depending upon glass composition, such that the glass will contain sufficient water to exhibit thermoplastic characteristics. The method enables the water content in the final glass body to be closely controlled.

United States Application Ser. No. 445,454 filed Feb. 24, 1974 in the names of J. E. Pierson and W. H. Tarcza, abandoned in favor of continuation-in-part Ser. No. 822,877, filed Aug. 8, 1977, describes a single-step process for hydrating glass particles having compositions identical to those operable in U.S. Pat. No. 3,912,481 supra. The inventive method involves contacting the glass particles with gaseous environments having relative humidities varying between about 5-50% at temperatures in excess of 225° C. The water content diffused within the glass, again depending upon glass composition, commonly ranged between about 1-25%. The resultant glass demonstrated thermoplastic properties.

U.S. Pat. No. 3,948,629 delineates yet another process for hydrating fine-dimensioned anhydrous glass bodies. The method involves a single-step process wherein glass particles are hydrated through contact with an acidic aqueous solution, i.e., an aqueous solution containing an acid or salt providing a pH of less than 6. By tailoring the glass composition, the makeup of the hydrating solution, and the temperature and pressure utilized in the hydration reaction, it is possible to closely control the amount of water absorbed into the glass structure. The process is also operable with the anhydrous glass composition recited in U.S. Pat. No. 3,912,481.

Plastics have been generally defined as a group of organic materials which, although stable in use at ambient temperatures, are plastic at some stage of manufacture which permits shaping thereof via the application of heat and/or pressure. Two broad classes of plastics have been recognized: (1) thermoplastic materials, illustrated by vinyl polymers, which are rendered soft and moldable by the application of heat; and (2) thermosetting materials, illustrated by phenol formaldehyde, which are rendered hard by the application of heat.

United States Application Ser. No. 830,603, filed concurrently herewith in the names of A. R. Olszewski and D. R. Parnell, discloses a method for forming anhydrous alkali silicate materials into solid bodies which are hydrated or wherein the silicate structure is depolymerized by protonic reagents. Such bodies may be produced through compression molding the anhydrous alkali silicate materials with water or other protonic reagent at elevated temperatures and high pressures. Other protonic reagents specifically mentioned include $NH_4OH$ and alcohols.

A very significant characteristic of hydrated glass is the capability of being shaped at much lower temperatures than anhydrous glass of identical composition (excluding, of course, the water diffused therein). Thus, many hydrated glasses can be extruded, compression molded, rolled, or otherwise formed at temperatures and pressures conventionally employed to shape long chain organic plastics. This capability has led to attempts to modify hydrated glasses with organic materials in an effort to impart plastic-like characteristics to glass. Prior work to modify hydrated glasses with organic materials was primarily directed to altering the material before processing. This early work was largely unsuccessful for a number of reasons including the use of inappropriate organic materials, inappropriate glass compositions, improper forming equipment, etc.

OBJECTIVES OF THE INVENTION

The primary objective of the instant invention is to provide an integral body composed of hydrated alkali metal silicate glass and an organic polymeric resin which will exhibit significant improvements in strength and toughness, when compared with the initial hydrated glass, and which will demonstrate excellent resistance to surface scratching.

Another objective of the instant invention is to provide a method for making such a body.

SUMMARY OF THE INVENTION

We have discovered that those objectives can be accomplished by shaping mixtures of particulate hydrated alkali metal silicate glasses and organic polymers into integral bodies at about the forming temperature of the hydrated glass, which temperature must be such that the resin does not decompose. A particularly useful method for producing such bodies contemplates co-molding mixtures of particulate hydrated alkali silicate glasses and epoxy resins in compression molds at elevated temperatures and pressures. Epoxy resins are classified as thermosetting plastic materials. However, the invention is not limited to epoxy resins. Both thermoplastic and thermosetting organic polymers can be operable so long as the processing temperature of the hydrated glass is below the temperature at which decomposition of the polymer takes place and the polymer is resistant to alkali attack. Likewise, the method of shaping the bodies is not limited to compression molding. For example, such processes as rolling, extruding, injection molding, and the like are applicable with the mixtures of the present invention.

As the definition suggests, once a thermosetting plastic has been shaped through the application of heat, no further molding or other manner of shaping is normally possible. However, mixtures of epoxy resins and hydrosilicate glass were found to be remoldable with some deterioration in properties, the basis for this phenomenon being adjudged to reside in the inherent thermoplastic characteristics of the hydrated glass.

Alkali metal silicate glasses having compositions such as are recorded in U.S. Pat. No. 3,912,481, Application Ser. No. 822,877, and U.S. Pat. No. 3,948,629, supra, are also operable in the instant invention. Hence, compositions useful in the invention consist essentially, in mole percent on the oxide basis, of about 3–25% $Na_2O$ and/or $K_2O$ and 50–95% $SiO_2$, the sum of those components constituting at least 55 mole percent of the total composition. MgO may advantageously be included in quantities up to 35%; PbO, ZnO, $B_2O_3$, and CaO can be present up to 25%; and $Al_2O_3$ and BaO can be useful in amounts up to 20%. Customarily, inclusions of other compatible ingredients such as, for example, CdO, $P_2O_5$, $SnO_2$, $TiO_2$, $WO_3$, and $ZrO_2$, will be maintained below 10% in individual amounts. Because $Li_2O$ appears to inhibit hydration and promote devitrification, if present at all it will be held below about 5%.

The method employed in hydrating the original anhydrous glass comprises no part of the instant invention. For example, any of the methods described in U.S. Pat. Nos. 3,498,802, 3,912,481, and 3,948,629, or Application Ser. No. 445,454, supra, can be utilized with equal utility in the final product. In general, the greater the amount of water absorbed within the glass structure, the more thermoplastic behavior will be demonstrated by the glass. However, an inverse relationship obtains with respect to the chemical durability exhibited by the hydrated glass. Therefore, the preferred water content will range between about 1–20% by weight, with the most desirable products being produced where the water content varies between about 3–15% by weight. Amounts in excess of about 20% commonly result in excessive shrinkage with consequent cracking.

Each of the six basic types of commercially marketed epoxy resins can be used successfully in the present invention. An amine curing agent for the epoxy resin appears to yield the best result. The curing agent will be included in the stoichiometric amount since the hydrated glass does not seem to substantively participate in the curing process.

Silane coupling agents to bond a thermosetting resin to the glass dramatically enhance the strength and toughness of the final product. Amino functional silane coupling agents appear to be more effective for that purpose then glycidoxy derivatives. Other functional groups seemed to significantly reduce the effectiveness of the silane coupling agent.

Precuring the thermosetting resin at slightly elevated temperatures prior to the comolding step is not essential to operability of the invention but appears to lead to more reproducible results in the final product, since uncontrolled room temperature curing of the resin is eliminated.

The use of coupling agents as such and the need for precuring are not required with thermoplastic resins.

The comolding process will be conducted in a closed system at temperatures between about 100°–350° C. and at pressures of at least about 1000 psi. At temperatures above about 350° C., the strength and relative toughness of the comolded products decrease precipitously. Forming pressures above about 20,000 psi can be employed successfully but no substantive advantage in properties has been evidenced in so doing.

Mixtures of about 25–96 parts by volume of hydrated glass and 4–75 parts by volume of selected resins have been successfully compression molded into integral homogeneous bodies. Obviously, lesser amounts of hydrated glass will be operable but the inherent characteristics imparted to the final product will be significantly diminished.

DESCRIPTION OF PREFERRED EMBODIMENTS

Table I records glass compositions, expressed in mole percent on the oxide basis, which are operable in the instant invention. The production of glass bodies from such compositions comprises no part of the present invention and is well within the technical ingenuity of the man of ordinary skill in the glassmaking art. U.S. Pat. No. 3,912,481, supra, discusses the formation of similar glasses on a laboratory scale. The production parameters recited therein are equally useful here.

As has been observed above, the method utilized to hydrate the glass comprises no part of the instant invention and is believed to be well within the capability of the man of ordinary skill in the art. The sole requirement is that the hydrated body contains about 1–20% by weight water.

TABLE I

| | 1 | 2 | 3 |
|---|---|---|---|
| $SiO_2$ | 43.2 | 67.7 | 73.2 |
| $Na_2O$ | 10.9 | 10.1 | 17.6 |
| MgO | 45.9 | — | 2.4 |
| $K_2O$ | — | 6.5 | 0.6 |

TABLE I-continued

|      | 1 | 2    | 3   |
|------|---|------|-----|
| ZnO  | — | 12.5 | —   |
| Al₂O₃ | — | 3.2  | 1.4 |
| CaO  | — | —    | 4.8 |

There are six basic types of commercially-marketed epoxy resins. The four most common types are diglycidyl ethers of bisphenol A, abbreviated to DGEBA, and bisphenol F, abbreviated to DGEBF, epoxy novolacs, and glycidyl esters of glycerol, abbreviated to GEG. A specialty type epoxy resin which is, in reality, a monomer is the glycidyl ether of tetrakis(hydroxyphenyl)ethane. Finally, the polyhydric phenol polyether alcohols (polyols) constitute another class of resins which are by custom referred to as epoxy resins because they are synthesized from the same starting materials.

Epoxy resins range in physical state at ambient temperature from very fluid liquids to waxy solids and must be treated with curing agents to be converted into hard plastic materials. There are three major classes of reagents routinely employed to cure epoxy resins: amines, acid anhydrides, and Lewis acid. However, laboratory experience has demonstrated that the acid reagents, including the anhydride curing agents, retard, if not totally prevent, curing of the epoxy when compounded with hydrated glass. Therefore, the amine curing agents are much to be preferred.

Numerous commercially-marketed silane coupling agents are available. Experience has demonstrated the excellence of glycidoxy coupling agents with amino coupling agents seeming to impart even more strength to the final integral composite body. An additional practical benefit arising from the use of amino coupling agents is that no separate curing agent is required if utilized at the stoichiometric amine level.

Table II sets out groups of epoxy resins, curing agents, and silane coupling agents which were employed in carrying out the work described hereinafter.

TABLE II

Epoxy Resins

| Resin | Form | Type | Source |
|-------|------|------|--------|
| EPON 828 | Liquid | DGEBA | Shell Oil |
| EPON 1031-B-80 | 80% Solids in Methyl Ethyl Ketone | Monomer | Shell Oil |
| D.E.R. 331 | Liquid | DGEBA | Dow Chemical |
| D.E.R. 438 | Viscous Liquid | Epoxy Novolac | Dow Chemical |

Curing Agents

| Curing Agent | Compound | Form | Type | Source |
|--------------|----------|------|------|--------|
| Z | — | Liquid | Aromatic Amine | Shell Oil |
| H-3 | — | Liquid | Ketimine Adduct | Shell Oil |
| AEP | N-aminoethyl-piperazine | Liquid | 1°, 2° + 3° Amine | Jefferson Chemical |
| DEH 50 | Methylene dianiline | Solid | Aromatic Amine | Dow Chemical |

Silane Coupling Agents
$(CH_3O)_3Si(CH_2)_3$-X

| Coupling Agent | X- | Source |
|----------------|----|----|
| C 600 | $CH_3OC(=O)(CH_2)_2NH(CH_2)_3NH-$ | Dow Corning |
| Z-6020 | $H_2N(CH_2)_3NH-$ | Dow Corning |
| Z-6031 | $CH_2=C(CH_3)-C(=O)-O-$ | Dow Corning |
| Z-6040 | $CH_2-CH-CH_2O-$ (epoxide) | Dow Corning |
| Z-6050 | Unspecified polyamino functionality HS- HS- | Dow Corning Aldrich |

In the work reported hereinafter, the hydrated glass was crushed into particles normally passing a 40 or 50 mesh United States Standard Sieve (420 or 297 microns) but resting upon an 80 mesh or 100 mesh Standard Sieve (177 or 149 microns). The use of very coarse particles, i.e., greater than about 10 mesh (2mm.), may result in the product not being uniform. At the other extreme, very fine particles, i.e., less than about 400 mesh (37 microns), lead to dusting in handling and may agglomerate, again resulting in a nonuniform final product.

The resins, curing agents, and coupling agents were used as received from the supplier.

The constituents were customarily blended together in a specific order. Hence, the coupling agent was first mixed with the hydrated glass particles. Thereafter, the epoxy resin was blended into that mixture. Finally, the curing agent was admixed thereto. Where a substantive precuring of the resin was undertaken, the charge mixture was transferred to an oven operating at a desired temperature. The mixture was charged into a one-inch diameter stainless steel compression mold fitted with TEFLON ® seals. The mold could be heated and the temperature thereof carefully controlled. Pressure was applied to the charge in the mold through a ram during the heating cycle.

Glass composition 1 of Table I was employed in the majority of the work reported hereinafter since experience has seemed to indicate that magnesia-containing glasses have an enhanced affinity for organic materials. Although volume ratios of about 25–96 parts of hydrated glass to 4–75 parts of resin can be useful, a glass-to-resin ratio of about 9:1 by weight or about 3:1 by volume was utilized in most of the studies recorded. This ratio results in a glass matrix with the epoxy filling the 26–37% void spaces of the glass where particles between about 40–80 mesh are employed.

EXAMPLE I 2.7 grams of −50+80 mesh particles of hydrated glass of composition 1 reported in Table I supra, containing 13.3% by weight $H_2O$, were blended with 0.01 gram of Z-6040 glycidoxy functional silane coupling agent (Table II) at room temperature. 0.3 gram of EPON 828 epoxy resin (Table II) was thoroughly mixed therewith and then 0.06 gram Z aromatic amine curing agent (Table II) admixed therewith. This charge was loaded into a one-inch diameter stainless steel sealed compression mold, compressed with a constant 12,700 psi pressure, and the mold electrically heated to 270° C. That temperature was held for 10 minutes, the heat removed from the mold, and, after a mold temperature of about 80° C. was reached, the pressure was released and the resultant disc allowed to cool to room temperature.

The disc appeared to be uniform, i.e., no grain boundaries from the original particles could be discerned by the unaided eye, with a uniformly opaque, amber color. The material demonstrated a shear modulus of $1.13 \times 10^6$ psi, a fracture strength of $1.23 \times 10^4$ psi, and a fracture energy of 0.47 J/cc. (This characteristic is a measure of the relative toughness of a material.) Such values are compared below with those exhibited by the original hydrated glass and a similarly cured epoxy resin.

|  | Shear Modulus | Fracture Strength | Fracture Energy |
|---|---|---|---|
| Glass | $9.0 \times 10^5$ psi | $1.0 \times 10^3$ psi | 0.003 J/cc |
| Epoxy | $1.7 \times 10^5$ psi | $1.2 \times 10^4$ psi | 50 J/cc |

This comparison clearly illustrates the significant improvement in those properties which the resin imparts to the hydrated glass.

EXAMPLE II 2.7 grams of −40+100 mesh particles of hydrated glass of composition 2 reported in Table I supra, containing 11.1% by weight $H_2O$, were blended with 0.1 gram of Z-6020 amine functional silane coupling agent (Table II) at room temperature. 0.3 gram of EPON 828 epoxy resin (Table II) was thoroughly mixed therewith. No additional curing agent as such was added because the amine functionality of the coupling agent was adequate to cure the resin. This charge was precured by heating for 20 minutes at a temperature of 130° C. Thereafter, the charge was turned into a one-inch diameter stainless steel compression mold, compressed with a constant 12,700 psi pressure, and the mold electrically heated to 290° C. After 15 minutes the heat was removed from the mold, and, after the mold reached a temperature of about 80° C., the pressure was released and the resultant disc permitted to cool to room temperature.

The resultant opaque, amber-colored disc appeared to be uniform throughout the exhibited a shear modulus of $9.97 \times 10^5$ psi, a fracture strength of $8.12 \times 10^3$ psi, and a fracture energy of 0.31 J/cc.

At the outset, it was not known whether curing agents for the epoxy resins would be necessary since hydrated glasses were known to have a large number of silanolate and silanol groups which could potentially participate in the curing process. Furthermore, there was also the question of whether coupling agents would be required. Answers to those questions can be found in Tables III, IV, and V infra where −40+80 mesh particles of composition 1 of Table I, hydrated to 18% by weight $H_2O$, comprised the glass portion. The general method described above in Example I was followed with about 10% by weight epoxy resin, the stoichiometric amount of curing agent, and 0.8 phr of the silane coupling agent being employed. In each instance, the compression molding was carried out at about 175° C. for about 15 minutes at 10,000 psi.

Table III reports the fracture strength (psi $\times 10^3$) of the comolded discs.

TABLE III

| Epoxy | Silane | Curing Agents | | | |
|---|---|---|---|---|---|
|  |  | None | AEP | H-3 | Z | DEH50 |
| None | None | 1.0 | — | — | — | — |
| 828 | None | — | — | 2.9 | — | 2.6 |
| 331 | None | 3.0 | 5.3 | — | 3.3 | — |
| 1031 | None | — | — | 2.2 | — | 3.0 |
| 438 | None | — | 3.75 | — | 3.25 | — |
| None | 6040 | 0.6 | — | — | — | — |
| 828 | 6040 | 2.9 | 5.7 | — | 4.9 | — |
| 331 | 6040 | — | — | 3.2 | — | 3.4 |
| 1031 | 6040 | 1.4 | 5.9 | — | 5.2 | — |
| 438 | 6040 | — | — | 5.8 | — | 6.2 |

Table IV records the shear modulus (psi $\times 10^5$) of the comolded discs.

TABLE IV

| Epoxy | Silane | Curing Agents | | | |
|---|---|---|---|---|---|
|  |  | None | AEP | H-3 | Z | DEH50 |
| None | None | 9.0 | — | — | — | — |
| 828 | None | — | — | 6.2 | — | 8.5 |
| 331 | None | 8.8 | 7.95 | — | 7.4 | — |
| 1031 | None | — | — | 5.3 | — | 8.8 |
| 438 | None | 11 | 7.8 | — | 10.1 | — |
| None | 6040 | 4.2 | — | — | — | — |
| 828 | 6040 | 8.9 | 6.4 | — | 6.8 | — |
| 331 | 6040 | — | — | 6.3 | — | 8.0 |
| 1031 | 6040 | 6.9 | 8.0 | — | 7.2 | — |
| 438 | 6040 | — | — | 7.5 | — | 8.6 |

Table V lists the fracture energy (J/cc) of the comolded discs.

TABLE V

| Epoxy | Silane | Curing Agents | | | |
|---|---|---|---|---|---|
|  |  | None | AEP | H-3 | Z | DEH50 |
| None | None | 0.003 | — | — | — | — |
| 828 | None | — | — | 0.04 | — | 0.02 |
| 331 | None | 0.05 | 0.07 | — | 0.05 | — |
| 1031 | None | — | — | 0.03 | — | 0.03 |
| 438 | None | — | 0.04 | — | 0.03 | — |
| None | 6040 | 0.01 | — | — | — | — |
| 828 | 6040 | 0.02 | — | — | 0.07 | — |
| 331 | 6040 | — | — | 0.05 | — | 0.03 |
| 1031 | 6040 | 0.007 | 0.09 | — | 0.08 | — |
| 438 | 6040 | — | — | 0.10 | — | 0.09 |

It is believed apparent from Tables III, IV, and V that the presence of both an epoxy curing agent and a silane coupling agent is normally demanded to insure the production of strong, tough bodies. Experience has indicated that utilizing the stoichiometric amount of curing agent and coupling agent yielded optimum properties in the comolded body. Therefore, such amount is definitely to be preferred with a reasonable operating range being no more than about ±20% of the stoichiometric amount.

Table VI reports changes in the physical properties of the comolded bodies as the weight ratio of glass-to-plastic is altered. The method generally outlined above for Example I was followed. Hence, −40+80 mesh particles of glass composition 1 of Table I hydrated to a $H_2O$ content of 12.5% by weight comprised the glass phase. EPON 828 epoxy resin was employed along with Z-6020 in stoichiometric amounts to act as a combination curing and coupling agent. The mixture was compression molded at 12,700 psi for 15 minutes at 170° C.

TABLE VI

| % Glass | Shear Modulus ($\times 10^5$ psi) | Fracture Strength ($\times 10^3$ psi) | Fracture Energy (J/cc) |
|---|---|---|---|
| 60% | 4.5 | 8.5 | 0.31 |
| 70% | 6.0 | 9.0 | 0.56 |
| 80% | 6.5 | 10.0 | 0.54 |
| 85% | 10.0 | 11.0 | 0.41 |
| 90% | 11.0 | 9.5 | 0.38 |

Maximum toughness (maximum fracture energy) was achieved with bodies containing 70–80% hydrated glass and the strength thereof averaged somewhat greater than 9500 psi over the range of 70–90% hydrated glass. These properties were drastically reduced when the glass content was lowered from 70% to 60% by weight. This value corresponds to the changeover from a glass matrix (50% by volume) to an epoxy matrix (64% by volume).

As was observed above, the temperature at which the organic polymer and the hydrated glass can be formed into an integral body is largely dictated by the viscosity characteristics of the hydrated glass. Since epoxy resins do not, in general, possess very good thermal stability, hydrated glasses must be selected which have sufficiently low forming temperatures to avoid thermal degradation of the epoxy component. Therefore, after an empirical determination of the optimum forming temperature for a particular combination of hydrated glass and epoxy, temperatures more than about 25° C. above that optimum will be eschewed, since both the strength and toughness of the resulting body will be seriously affected.

The length of time at which the compression molding was conducted at elevated temperatures can also affect the final properties of the integral bodies. In the laboratory work described herein, optimum properties were attained in about 10 minutes with some deterioration in properties witnessed after longer periods. Pressing times of less than about 10 minutes yielded less favorable results, probably reflecting the time necessary for the compression mold and the mixture of glass and epoxy to reach thermal equilibrium. It will be recognized, of course, that pressing times will be a function of the resin used, the size of the body formed, and the temperature utilized in the forming step, as well as the mechanical characteristics of the processing equipment.

Epoxy resins are frequently thermally treated after casting to complete curing thereof. Although it was believed that the compression molding, an undertaken, achieved complete curing, post treating of the integral bodies was studied.

A 9 to 1 glass-to-epoxy weight ratio mixture of $-40+80$ mesh particles of composition 1 of Table I containing 14% $H_2O$ was compression molded in a manner similar to that reported in Example I for 15 minutes at 170° C. utilizing EPON 828 resin and Z-6020 combination curing and coupling agent.

Table VII records property measurements obtained on the resulting discs and compares those with measurements performed on one sample after a one hour post treatment at 100° C. and on another sample after a one hour post treatment at 150° C.

TABLE VII

| Sample | Shear Modulus ($\times 10^5$ psi) | Fracture Strength ($\times 10^3$ psi) | Fracture Energy (J/cc) |
|---|---|---|---|
| As Made | 8.7 | 9.5 | 0.38 |
| 100° C. | 8.4 | 9.4 | 0.38 |
| 150° C. | 6.5 | 4.0 | 0.08 |

It is quite apparent that, whereas the 100° C. post treatment produced little effect upon the physical properties of the product, the 150° C. treatment caused serious deterioration thereof.

Inasmuch as some curing of the epoxy resin can take place at room temperature, a precuring step prior to compression molding appears to aid in achieving more reproducible results. The use of about 120° C. for about 10 minutes was found to be particularly useful.

The capability of remolding epoxy-hydrosilicate composites was discovered by curing the epoxy separately in the conventional manner and thereafter molding the ground, cured epoxy with the hydrosilicate. Thus, EPON 828 epoxy resin was cured with a stoichiometric amount of AEP (Table II) in the conventional manner, ground to pass a No. 100 United States Standard Sieve (149 microns), and then combined with 10 phr Z-6020 coupling agent. A 9:1 weight ratio of $-40+80$ mesh particles of compositions 1, 2, and 3 reported in Table I supra, composition 1 containing about 13.9% by weight $H_2O$, composition 2 containing about 9.1% by weight $H_2O$, and composition 3 containing about 17.7% by weight $H_2O$, to epoxy resin was thereafter compounded and thoroughly mixed together. The charge was transferred to a one-inch diameter stainless steel compression mold, 12,700 psi applied thereto, and the mold heated to 210° C. After about 15 minutes the heat was removed from the mold, and, upon the mold reaching a temperature of about 80° C., the pressure was released and the resultant disc allowed to cool to ambient temperature.

Table VIII records the fracture strength (psi $\times 10^3$), the shear modulus (psi $\times 10^5$), and the fracture energy (J/cc) of the comolded discs.

TABLE VIII

| Composition | Fracture Strength | Shear Modulus | Fracture Energy |
|---|---|---|---|
| 1 | 3.9 | 8.5 | 0.08 |
| 2 | 4.3 | 9.5 | 0.07 |
| 3 | 4.3 | 5.6 | 0.19 |

A disc prepared of composition 2 in the manner described immediately above was accidentally fractured before physical measurements were determined thereupon. The pieces thereof were returned to the compression mold and a second disc pressed therefrom utilizing the same molding parameters as the first pressing. The resultant disc exhibited a fracture strength of $5.7 \times 10^3$ psi, a shear modulus of $9.3 \times 10^5$ psi, and a fracture energy of 0.14 J/cc. From these data it appears that the second molding had a beneficial effect upon the final properties.

Finally, a disc was prepared of composition 2 in a manner similar to that described immediately above except that Z-6040 (Table II) was utilized as the coupling agent and the charge was molded at 200° C. using a compressive force of 3200 psi. The resultant disc demonstrated a fracture strength of $7.7 \times 10^3$ psi, a shear modulus of $10.8 \times 10^5$ psi, and a fracture energy of 0.19 J/cc.

That the inventive method is not limited to the epoxy-type thermosetting resins is evidenced in Table IX infra. Thus, discs were prepared having a 9:1 weight ratio of $-40+80$ mesh particles of composition 2 of Table I containing about 9.1% by weight $H_2O$ to a phenolic resin (supplied by Hooker Chemical Corporation under the name Durex 12763) or a polyaryl ether resin (supplied by Ciba-Geigy Corporation under the term Xylok 235C). A stoichiometric amount of methyl ethyl ketone peroxide was employed as a curing agent for the polyaryl ether whereas no additional curing agent was required for the Durex 12763. Z-6020 (Table II) was utilized as the coupling agent for each resin. The molding was conducted for about 15 minutes at about 210° C. under a pressure of 12,700 psi.

TABLE IX

| Resin | Fracture Strength | Shear Modulus | Fracture Energy |
|---|---|---|---|
| Durez 12763 | $6.5 \times 10^3$ psi | $15 \times 10^5$ psi | 0.11 J/cc |
| Xylok 235C | $6.7 \times 10^3$ psi | $13 \times 10^5$ psi | 0.13 J/cc |

A disc prepared in like manner to that described above from composition 1 of Table I containing about 13.9% by weight water and Xylok 235C exhibited a fracture strength of $5.2 \times 10^3$ psi, a shear modulus of $7.4 \times 10^5$ psi, and a fracture energy of 0.16 J/cc.

It will be apparent, of course, that the resins must possess the capability of surviving the hot, aqueous, alkaline hydrated glass environment during the shaping procedure in order to be operable in the invention. This factor provides a guideline for resins suitable for the inventive method.

Of the 22 generic types of thermoplastic resins explored, 17 were found capable of being compression molded with the alkali hydrosilicate glasses to yield a coherent body with very little or no evidence of degradation. Expressed differently, only five of the generic thermoplastics exhibited unsatisfactory resistance to the environment inherently present with alkaline hydrated glass. The three glass compositions reported in Table I were also employed in the following examples, composition 1 containing about 13.9% by weight $H_2O$, composition 2 containing about 9.1% by weight $H_2O$, and composition 3 containing about 17.7% by weight $H_2O$. Table X recites specific examples of the various generic classes of resins utilized in the molding processes described hereinafter.

after a mold temperature of about 80° C. was reached, the pressure was released and the resultant disc permitted to cool to ambient temperature.

The suitability of a generic class of thermoplastic was based upon the capability for forming an acceptable disc with each of the three hydrosilicate compositions. An acceptable disc is defined as comprising a coherent body exhibiting essentially no signs of polymer degradation, i.e., odor, discoloration, oily or irregular surfaces, and which can be cut with a diamond saw under cooling water for mechanical testing.

In general, the molded discs were translucent to opaque in appearance. This circumstance is conjectured to be due to particle size distribution and differences in refractive index and coefficient of thermal expansion existing between the resins and the hydrosilicate glass. Microscopic examination of the polymer-hydrosilicate discs suggests that the organic material maintains an approximate degree of dispersion initially present in the powdered starting mixture.

The pieces of a fractured disc prepared from a mix-

TABLE X

| Generic Class | Resin | Source | Alkali Effect | Melting Temp. ° C. |
|---|---|---|---|---|
| ABS (acrylonitrile-butadiene-styrene) | 500 | Dow | None | 220-275 |
| Acetal homopolymer | polyacetal | Aldrich | Attacked | 193-243 |
| Acetal copolymer | Celcon M25 | Celanese | None | 204-232 |
| Acrylic adhesive | Lucite 2041 | DuPont | Slight | 227-260 |
| Acrylic molding | Lucite 47 | DuPont | Slight | 227-260 |
| Alloy (ABS/PC) | Cycoloy 800 | Borg-Warner | Slight | 254-277 |
| Arylsulfone | Astrel HC-5610 | 3M | None | 400-415 |
| Cellulosic | E-400-25 | Eastman | Decomposes | 130-215 |
| Fluorocarbon ETFE | Tefzel 2000 | DuPont | None | 300-340 |
| Fluorocarbon TFE | Teflon 7A | DuPont | None | 360-380 |
| Ionomer | Surlyn 5001 | DuPont | Resistant | 175-290 |
| Nylon 6/6 | 6/6 | LNP | Resistant | 265-290 |
| Poly(amide-imide) | Torlon 2000 | Amoco | Attacked | 332-343 |
| PC(polycarbonate) | Lexan 145 | GE | Attacked | 260-327 |
| Polyester (PTMT) | Valox 310 | GE | Attacked | 238-249 |
| Polyethersulfone | PES-200P | ICI | None | 350-390 |
| Polymethylpentene | TPX RT 18P | Mitsui | Resistant | 280-290 |
| Polyphenylene oxide | Noryl 731 | GE | None | 204-238 |
| Polyphenylene sulfide | Ryton P-3 | Philips | None | 316-343 |
| Polystyrene | Piccolastic D-100 | Hercules | None | 130-204 |
| Vinyl | Geon 103EP | Goodrich | None | 150-204 |
| Polyethylene | Dylan SDF-640 | Sinclair-Koppers | Resistant | 150-230 |

Inasmuch as the above commercial resins were, for the most part, available in pellet form only, cryogenic grinding was utilized to reduce the pellets to particles passing an 80 mesh Standard Sieve. The hydrated glasses were also used as particles passing an 80 mesh Standard Sieve.

Table XI records results observed from comolded mixtures of the resins reported in Table X and the hydrated glasses listed in Table I. The mixtures consisted of about 3 parts by volume of the hydrosilicate glass and 1 part of volume of the resin. The admixed charge was loaded into a one-inch diameter stainless steel sealed compression mold, compressed under 12,700 psi, and the mold electrically heated to a temperature approximating the minimum temperature required to achieve flow in the resin. That temperature was maintained for about 15 minutes, the heat removed from the mold, and, ture of hydrosilicate composition 2 and Surlyn 5001 (Table X) were returned to the mold and re-formed into a disc following the method outlined immediately above. An acceptable disc was generated, thereby demonstrating the capability of remolding the resin-hydrosilicate composites.

The polymer-hydrosilicate bodies were characterized in terms of fracture energy (joules/cc), fracture strength (psi $\times$ $10^3$), and shear modulus (psi $\times$ $10^5$). The fracture strength values (modulus of rupture), reported in Table XI, are to be considered as abraded strengths, since samples were cut from the discs via a diamond saw resulting in two abraded sides on each sample. The polymer-hydrosilicate fracture energies, listed in Table XII, were determined from the area under the stress-strain curve. The shear moduli of the composite bodies are recited in Table XIII.

TABLE XI

| Polymer | (Fracture Strength) Composition 1 | Composition 2 | Composition 3 |
|---|---|---|---|
| None | 9.07 | 11.78 | 3.4 |
| ABS | 5.37 | 2.52 | 3.33 |
| Acetal homopolymer | decomposed | decomposed | — |

TABLE XI-continued

| Polymer | (Fracture Strength) Composition 1 | Composition 2 | Composition 3 |
|---|---|---|---|
| Acetal copolymer | 5.69 | 4.62 | 4.98 |
| Acrylic adhesive | 4.41 | 4.88 | leached |
| Acrylic molding | 4.30 | 3.77 | leached |
| Alloy (ABS/PC) | 4.97 | 3.54 | 2.96 |
| Arylsulfone | 3.07 | 6.82 | 3.08 |
| Cellulosic | decomposed | 3.48 | 4.54 |
| Fluorocarbon ETFE | 1.59 | 3.77 | 2.72 |
| Fluorocarbon TFE | — | 2.17 | — |
| Ionomer | 1.24 | 1.37 | 1.77 |
| Nylon 6/6 | 2.16 | 3.00 | 2.29 |
| Poly(amide-imide) | decomposed | 5.2 | decomposed |
| Polycarbonate | decomposed | 1.62 | decomposed |
| Polyester (PTMT) | decomposed | 2.62 | decomposed |
| Polyethersulfone | 5.71 | 4.28 | 2.74 |
| Polyethylene (HDPE) | 3.50 | 2.12 | 2.64 |
| Polymethylpentene | 1.61 | 4.54 | 3.73 |
| Polyphenylene oxide | 4.74 | 3.99 | 1.24 |
| Polyphenylene sulfide | 1.42 | 0.93 | 2.50 |
| Polystyrene | 4.33 | 3.05 | 4.47 |
| Vinyl | 6.70 | 4.18 | 2.96 |

TABLE XII

| Polymer | (Fracture Energy) Composition 1 | Composition 2 | Composition 3 |
|---|---|---|---|
| None | 0.25 | 0.38 | 0.06 |
| ABS | 0.18 | 0.17 | 0.175 |
| Acetal homopolymer | decomposed | decomposed | — |
| Acetal copolymer | 0.24 | 0.21 | 0.35 |
| Acrylic adhesive | 0.11 | 0.14 | leached |
| Acrylic molding | 0.09 | 0.09 | leached |
| Alloy (ABS/PC) | 0.11 | 0.12 | 0.10 |
| Arylsulfone | 0.05 | 0.16 | 0.05 |
| Cellulosic | decomposed | 0.15 | 0.12 |
| Fluorocarbon ETFE | 0.02 | 0.08 | 0.13 |
| Fluorocarbon TFE | — | 0.05 | — |
| Ionomer | 0.08 | 0.05 | 0.12 |
| Nylon 6/6 | 0.05 | 0.06 | 0.14 |
| Poly(amide-imide) | decomposed | 0.23 | decomposed |
| Polycarbonate | decomposed | 0.02 | decomposed |
| Polyester (PTMT) | decomposed | 0.035 | decomposed |
| Polyethersulfone | 0.145 | 0.095 | 0.11 |
| Polyethylene (HDPE) | 0.11 | 0.05 | 0.17 |
| Polymethylpentene | 0.035 | 0.10 | 0.09 |
| Polyphenylene oxide | 0.11 | 0.13 | 0.04 |
| Polyphenylene sulfide | 0.03 | 0.005 | 0.09 |
| Polystyrene | 0.10 | 0.05 | 0.135 |
| Vinyl | 0.20 | 0.17 | 0.11 |

TABLE XIII

| Polymer | (Shear Modulus) Composition 1 | Composition 2 | Composition 3 |
|---|---|---|---|
| None | 15.9 | 13.5 | 8.2 |
| ABS | 8.2 | 4.5 | 4.3 |
| Acetal homopolymer | decomposed | decomposed | — |
| Acetal copolymer | 8.5 | 6.5 | 6.1 |
| Acrylic adhesive | 8.1 | 8.7 | leached |
| Acrylic molding | 9.8 | 9.7 | leached |
| Alloy (ABS/PC) | 9.4 | 6.8 | 4.3 |
| Arylsulfone | 9.8 | 12.0 | 7.9 |
| Cellulosic | decomposed | 8.1 | 8.9 |
| Fluorocarbon ETFE | 7.1 | 8.0 | 4.5 |
| Fluorocarbon TFE | — | 6.9 | — |
| Ionomer | 2.4 | 3.5 | 2.6 |
| Nylon 6/6 | 6.4 | 10.8 | 3.1 |
| Poly(amide-imide) | decomposed | 7.7 | decomposed |
| Polycarbonate | decomposed | 10.3 | decomposed |
| Polyester (PTMT) | decomposed | 8.8 | decomposed |
| Polyethersulfone | 9.8 | 9.9 | 3.9 |
| Polyethylene (HDPE) | 7.4 | 5.1 | 2.9 |
| Polymethylpentene | 6.1 | 9.5 | 5.9 |
| Polyphenylene oxide | 8.6 | 10.1 | 3.7 |
| Polyphenylene sulfied | 7.7 | 8.1 | 4.3 |
| Polystyrene | 8.0 | 8.5 | 7.0 |
| Vinyl | 10.2 | 7.8 | 4.5 |

The failures of the five generic thermoplastics reported in Tables XI–XIII, viz., acetal homopolymer, cellulosic, poly(amide-imide), polycarbonate, and polyester, were the result of degradation due to alkali attack. Finally, whereas the composition of the hydrosilicate glass can have an effect upon the mechanical properties of the polymer-hydrosilicate composites, this variation in properties is not constant with hydrosilicate composition. Stated differently, relative ranking of the several thermoplastics with respect to the final product is substantially independent of the hydrosilicate composition.

We claim:

1. A uniformly coherent, integral body composed of hydrated alkali metal silicate glass having a water content between about 1-20% by weight and an organic polymer resistant to a hot, aqueous, alkaline environment, said body exhibiting no grain boundaries discernible by the unaided eye and essentially no signs of polymer degradation.

2. An integral body according to claim 1 wherein said alkali metal silicate glass consists essentially, in mole percent on the oxide basis, of about 3-25% $Na_2O$ and/or $K_2O$ and 50-95% $SiO_2$, the sum of those components constituting at least 55 mole percent of the total composition.

3. An integral body according to claim 1 wherein said $H_2O$ content ranges between about 3-15% by weight.

4. An integral body according to claim 1 wherein said organic polymer is a thermosetting resin.

5. An integral body according to claim 4 also containing a curing agent and a coupling agent.

6. An integral body according to claim 1 wherein said organic polymer is a thermoplastic polymer.

7. An integral body according to claim 6 also containing a coupling agent.

8. An integral body according to claim 1 wherein said hydrated glass constitutes about 25-96 parts by volume.

* * * * *